United States Patent [19]
Garrison

[11] Patent Number: 5,135,772
[45] Date of Patent: Aug. 4, 1992

[54] METHOD FOR APPLYING A RENEWABLE LUBRICATION FILM TO MAGNETIC DISKS

[76] Inventor: Marvin C. Garrison, 6350 Mesedge Dr., Colorado Springs, Colo. 80919

[21] Appl. No.: 684,579

[22] Filed: Apr. 12, 1991

[51] Int. Cl.$^5$ .............................................. B05D 5/12
[52] U.S. Cl. ........................ 427/11; 427/129; 427/130; 427/131; 427/255.5; 427/255.6; 427/302; 427/333; 427/346; 427/355; 427/407.1
[58] Field of Search ............... 427/302, 11, 129, 130, 427/131, 255.5, 255.6, 333, 346, 355, 407.1

[56] References Cited

U.S. PATENT DOCUMENTS 4,188,434 2/1980 Loran ..................................... 428/65
4,626,941 12/1986 Sawada ................................. 360/97

OTHER PUBLICATIONS

Hermance H. W. & Egan T. F. Organic Deposits on Precious Metal Contacts, Bell Sys. Tech J. May 1958 pp. 757–759, 63 & 64 pp. 764–767.

*Primary Examiner*—Bernard Pianalto
*Attorney, Agent, or Firm*—John R. Ley; Bruce R. Winsor

[57] ABSTRACT

A method and apparatus for generating lubricant at the head/disk interface throughtout the life of a disk drive utilizing friction at the slider/disk interface to activate the polymerization of a monomer at the catalytic surface on the slider and/or the disk surface. The monomer is supplied to the catalytic surface through the vapor state from a reservoir.

5 Claims, 1 Drawing Sheet

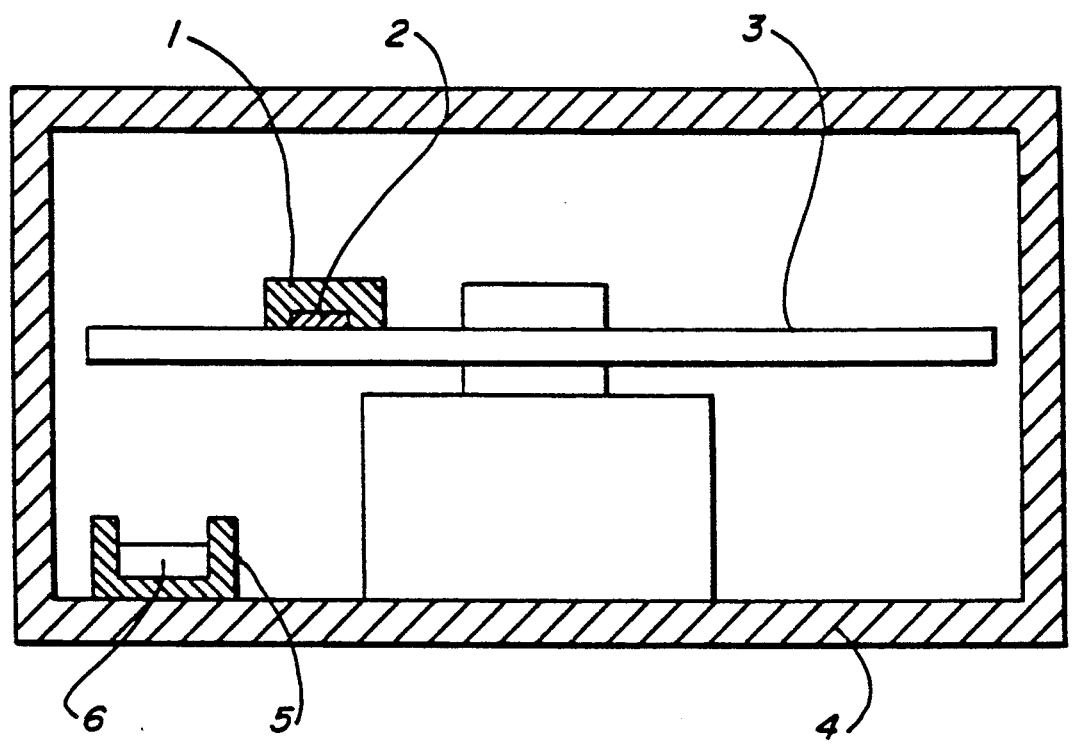
Fig_1

METHOD FOR APPLYING A RENEWABLE LUBRICATION FILM TO MAGNETIC DISKS

BACKGROUND

1. Field of Invention

This invention relates to lubrication for rotating disk information storage devices. More particularly to an apparatus and method for renewing spent lubrication films on rotating disk memories.

2. Background of the Invention

The problem of friction and wear in rotating magnetic disk memories has been approached from two general directions. One was the introduction of flying heads to separate the head from the rapidly rotating disk in an attempt to avoid the problem altogether. The conflicting need to reduce the head/disk separation in quest of higher recording densities causes occasional head disk contact. This problem has been addressed by the use of lubricants. The problem becomes more severe as that head/disk separation continues to be reduced with each successive generation of higher density disk drives. It will become critical when the separation is reduced to zero, as in the case of the scheme called contact recording, where the head slides on the disk surface.

There have been a number of approaches to this lubrication problem. The liquid lubricants used in gamma ferric oxide overcoated disks have been applied to the subsequent generation of metallic thin film media, with limited success. Spin off and evaporation of this liquid layer eventually reduces the efficacy of the lubricant. One approach to this problem, which is taught in U.S. Pat. No. 4,188,434 to Loran, is to mix a solid lubricant with the liquid lubricant.

Another solution is offered in U.S. Pat. No. 4,626,941 to Sawada where the evaporation of the lubricant from the disk surface is suppressed by evaporating quantities of the lubricant from a reservoir placed in the disk drive. This scheme supplies lubricant vapor at a vapor pressure higher than that exhibited at the disk surface via a temperature differential, thus distilling the lubricant onto the operating disk. This method transfers lubricant not only to the disk but also to the other components within the disk drive, and does not regulate how much is transferred to the disk.

As can be seen, the prior art is directed at solving the lubrication problems of flying heads and does so only in an imperfect way. None of the schemes are adequate for the ultimate case of contact recording.

These difficulties can be overcome by abandoning the techniques of trying to suppress the loss of a topical lubricant and resorting to a method of generating the lubricant on the disk surface as it is needed, i.e. adopting a scheme of "lubricant on demand."

Therefore it is an object of this invention to utilize a material, and process of its generation, known as frictional polymer, to solve the problems of lubricant retention in disk drive systems.

The term frictional polymer was coined by Hermance and Egan in the article "Organic Deposits on Precious Metal Contacts" in The Bell System Technical Journal; May 1958 pg 739. This material is a result of catalytic materials rubbing together in low concentrations of organic vapors. As stated there the mechanism is, ". . . first to involve chemisorption of the vapor on the metal, followed by frictional activation and polymerization of the chemisorbed layers to form the visible accumulation." In the case of relay contacts this effect is a nuisance causing open circuits. In the era before heads flew over the disk, and particularly with rhodium overcoated disks, the accumulation was a problem causing head crashes.

This heretofore detrimental effect can be put to use for lubricating disks by limiting the area of catalytic surface relative to the total frictional surface, thus controlling the amount of polymer generated. This is different from the approach of Sawada who teaches the transfer of lubricant from a reservoir to the disk surface. This present invention invokes monomers or mixtures of monomers, that by themselves are not necessarily lubricants, but when transferred to a catalytic surface are polymerized to larger lubricating molecules by the action of friction. This polymerized to lubricant is then spread on the disk by action of the slider. This latter action is related to the self limiting feature of the process. When there is sufficient lubricant polymer on the disk surface, there is also enough to coat the catalyst surface which blocks vapor adsorption, thus controlling the generation of the lubricant polymer.

OBJECTS AND ADVANTAGES

Therefore it is an object of this invention to provide a means of generating lubricants between sliding surfaces and renewing those lubricants as they are worn away.

It is an object of this invention to control the generation of frictional polymer and use it as a lubricant for recording head/disk interfaces.

A further object is to provide the disk drive designer with a variety of catalysts and monomers for use in building drives with renewable lubricants.

It is another object of this invention to provide the magnetic recording disk manufacturer with a method of incorporating catalysts into the disk surface for producing renewable lubricants.

Also an object is to provide, in a controlled way, a means of delivering a monomer, or monomers, to the atmosphere in which the sliding surfaces operate by providing a delivery reservoir for the monomers.

Other and further objects and advantages of this invention will become apparent as the specification progresses.

BRIEF DESCRIPTION OF THE DRAWINGS

FIG. 1 is a cross-sectional elevation view of a magnetic disk drive according to this invention, having a monomer evaporation source and a catalytic surface at the slider/disk interface.

DESCRIPTION OF THE PREFERRED EMBODIMENTS

The simplest embodiment of this invention can be seen by referring to FIG. 1, a schematic representation of the cross section elevation of a magnetic disk drive. The slider 1 operates in either occasional or continuous contact with the rotating disk 3. The monomer source 6 in its reservoir 5 partially evaporates to exhibit a vapor pressure in the enclosed space 4 of the disk drive. The monomer vapor is adsorbed on the slider surface and more particularly the catalytic surface 2 of that slider. The friction of the slider surface on the disk supplies the activation energy for the monomer's polymerization. The resulting polymer, being a solid with a greatly reduced vapor pressure, does not evaporate but rather is distributed on the disk surface and performs its function as a lubricant. When the disk is sufficiently coated with the polymer lubricant, transfer from the catalyst's surface is reduced, inhibiting the generation of frictional polymer, since no vapor can adsorb on the catalyst's surface covered with the polymer. As the lubricant is removed from the disk, due to wear, transfer mechanisms, or whatever, it is replaced from the catalyst's surface, exposing that surface to monomer vapor, thus more polymer is generated. The foregoing is the "catalyst on slider" embodiment.

In this embodiment it is obvious the catalytic surface can be affixed to the slider in a number of ways. Some examples are: The material can be deposited on the slider by plating, sputtering, vapor deposition, etc. A block of the catalyst can be bonded to the slider surface, it can be present as an insert, or the entire slider can be of catalytic material.

As noted by Hermance et. al. the most effective catalysts are the precious metals such as platinum, rhodium, palladium, etc. This invention does not limit itself to these very active catalysts, nor even to just metallic catalysts, because one of its advantages is to offer the drive designer flexibility in both his design and the materials involved. Thus the catalyst here is any material that will generate frictional polymer with any desired monomer. As Hermance has noted, different monomer/catalyst combinations result in differing efficacies in producing polymers.

Different monomers produce polymers with varying lubrication properties. Because of the variety of compounds that can be used as monomers, the reservoir of these can taken on various forms, all accomplishing the same function of supplying the monomer vapor. Thus thin liquids might be held in containers with vented caps, or porous structures, etc. Viscous materials may be held in a cup. Solids can act on their own without a container. It is obvious the process can include a plurality of monomers in various ratios.

It is also obvious that the slider can carry both the read/write head element and the catalytic surface, or the catalytic surface can be on a separate specially designed slider.

In the "catalyst on disk" embodiment of this invention the catalytic material is deposited on the disk in either regular or irregular patterns. Alternatively the catalytic materials can be included in the disk overcoat, converting the overcoat to a catalytic surface of the desired activity. In this embodiment the tribo effects are between the slider material and the catalyst on the disk surface, but the same effects of frictional polymer generation occur, and the same monomer reservoir schemes apply.

While the above description contains many specificities these should not be construed as limitations on the scope of the invention, but rather as an exemplification of one preferred embodiment thereof. Many other variations are possible. For example the process can be applied to other lubrication needs such as the lubrication of commutator rings and brushes.

Accordingly, the scope of the invention should be determined, not by the embodiments, but by the appended claims and their legal equivalents.

What is claimed is:

1. A method of lubricating sliding surfaces comprising:
   including a catalytic surface on at least a portion of at least one of the said sliding surfaces and operating said sliding surfaces in an atmosphere comprising at least one monomer species that will polymerize on said catalytic surface under the action of friction.

2. A method as defined in claim 1 further comprising:
   evaporating a monomer vapor from a monomer source reservoir to form the atmosphere comprising at least one monomer species.

3. A method as defined in claim 1 wherein the sliding surfaces comprise a first sliding surface having a catalytic material on at least a portion of the first sliding surface, and a second sliding surface, said method further comprising:
   adsorbing the monomer species to the catalytic material of the first sliding surface;
   sliding the first sliding surface in frictional contact with the second sliding surface;
   polymerizing the monomer species to create a lubricating polymer; and
   distributing the lubricating polymer on at least one of the sliding surfaces.

4. A method as defined in claim 3 wherein:
   the first catalytic sliding surface comprises a rotating disk memory slider;
   the second sliding surface comprises a rotating disk memory disk; and
   distributing the lubricating polymer further comprises distributing the lubricating polymer on the second sliding surface.

5. A method as defined in claim 3 wherein:
   the first sliding surface comprises a rotating disk memory disk;
   the second sliding surface comprises a rotating disk memory slider; and
   distributing the lubricating polymer further comprises distributing the lubricating polymer on the first sliding surface.

* * * * *